United States Patent
Ito

(10) Patent No.: US 7,466,828 B2
(45) Date of Patent: Dec. 16, 2008

(54) VEHICLE AUDIO SYSTEM AND REPRODUCTION METHOD USING SAME

(75) Inventor: Tsuyoshi Ito, Iwaki (JP)

(73) Assignee: Alpine Electronics, Inc.

(*) Notice: Subject to any disclaimer, the term of this patent is extended or adjusted under 35 U.S.C. 154(b) by 769 days.

(21) Appl. No.: 10/299,045

(22) Filed: Nov. 18, 2002

(65) Prior Publication Data

US 2003/0103634 A1  Jun. 5, 2003

(30) Foreign Application Priority Data

Nov. 20, 2001 (JP) ............... 2001-355114

(51) Int. Cl.
 *H04B 1/00* (2006.01)
(52) U.S. Cl. ........................ 381/86; 381/119
(58) Field of Classification Search .............. 381/86, 381/302, 123, 104–109, 81, 119; 455/569.2; 700/94

See application file for complete search history.

(56) References Cited

U.S. PATENT DOCUMENTS

| | | | |
|---|---|---|---|
| 5,034,984 A * | 7/1991 | Bose ........................... | 381/86 |
| 5,129,004 A * | 7/1992 | Imai et al. .................... | 381/86 |
| 5,384,855 A * | 1/1995 | Kwang ....................... | 381/100 |
| 5,617,480 A * | 4/1997 | Ballard et al. ................ | 381/98 |
| 5,661,811 A | 8/1997 | Huemann et al. | |
| 5,754,664 A * | 5/1998 | Clark et al. .................. | 381/86 |
| 6,252,968 B1 * | 6/2001 | Narasimhan et al. ........ | 381/103 |
| 6,330,337 B1 | 12/2001 | Nicholson et al. | |
| 6,567,655 B1 * | 5/2003 | Wietzke et al. ............. | 455/345 |
| 6,870,935 B2 * | 3/2005 | Vilkinofsky et al. .......... | 381/86 |
| 2003/0021433 A1 * | 1/2003 | Lee ............................. | 381/302 |
| 2006/0034467 A1 * | 2/2006 | Sleboda et al. ................ | 381/86 |

FOREIGN PATENT DOCUMENTS

| | | |
|---|---|---|
| JP | H03-062699 | 3/1991 |
| JP | H04-070098 | 3/1992 |
| JP | H02-110209 | 6/1992 |
| JP | H11-317638 | 11/1999 |
| JP | 11-1931170 | * 1/2001 |
| JP | 200125100 | * 1/2001 |

* cited by examiner

*Primary Examiner*—Vivian Chin
*Assistant Examiner*—Lun-See Lao
(74) *Attorney, Agent, or Firm*—Brinks Hofer Gilson & Lione

(57) ABSTRACT

A vehicle audio system having a subwoofer mounted in the vicinity of a rear seat is provided for permitting a user or passenger in the rear seat to receive or listen to audio information without having a sense of incongruity upon listening, even when he/she selects an audio source different from that selected on a front seat side. A vehicle audio system 10 comprises audio sources 11 to 13, an audio signal output means (including a headphone 4 for the rear seat, a subwoofer 3 disposed in the vicinity of the rear seat, and the like), an audio output selector 40 for selectively switching the audio signal from the selected source to connect it to the audio signal output means, and a controller 20. If the controller 20 detects predetermined input information while the audio signal is being provided from the subwoofer 3, the audio output selector 40 interrupts the connection of the audio signal to the subwoofer 3 based on control by the controller 20.

20 Claims, 5 Drawing Sheets

VEHICLE AUDIO SYSTEM AND REPRODUCTION METHOD USING SAME

BACKGROUND OF THE INVENTION

1. Field of the Invention

The present invention relates to a vehicle audio system and a reproduction method using same. More particularly, the present invention relates to a rear seat audio system having a deep bass reproduction speaker ("subwoofer") mounted thereon, which reduces or eliminates inconvenient vibrations created by the subwoofer. The vibrations occur especially when the system supplies a user or passenger in a rear seat with audio information from an audio source such as a CD changer (CDC), a radio tuner, or the like.

Such a rear seat audio system is called a rear entertainment system (RES: Rear Entertainment System), and is generally in a large luxury vehicle.

2. Description of the Related Art

Conventional rear entertainment systems are provided with operating units (including an operating section, a controller, and the like) that are adapted for operations such as selection of an audio source, adjustment of volume and audio quality, or the like, which operations are instructed by a user riding in a rear seat. Also, the systems are provided with a headphone and the like by which the user listens to an audio signal (sound) produced from the selected source. Generally, in known vehicles with such systems, the same kind of apparatus is installed at a front seat area, too. In this case, for the convenience of a driver, a speaker for the front seat area is provided instead of the headphone.

There is a wide variety of arrangements for the speakers. In the typical rear entertainment system, shown in FIG. 2, four speakers 1L, 1R, 2L, and 2R are arranged on the left side and right side of the front seat, and on the left side and right side of the rear seat, respectively. In most cases, there is further provided a deep bass reproduction speaker (subwoofer 3) in the vicinity of the rear seat (in the center thereof).

In the rear entertainment systems as described above, a user in the rear seat or the front seat operates various operating keys disposed in the operating section, and gives the system instructions to select the audio source, or to provide the audio signal supplied from the selected source over the headphone or the speaker. Otherwise, he/she gives instructions for operation (such as seeking up/down, adjustment of the volume or audio quality, or the like) to the audio source, from which audio information is being supplied over the headphone or speaker. Thus, based on these instructions given by the user, the audio source has its operating state set by a controller, and the operating state is recognized or listened to by the user over the headphone or the speaker.

In a case where the user in the rear seat listens to the same audio source (audio signal) as that selected in the front seat, the headphone is not utilized, and the audio signals can be heard from all the speakers. In contrast, when the rear seat user selects an audio source different from that selected by the front seat user, the front seat user listens to the audio source selected on the front side over each speaker, while the rear seat user listens to the audio source selected on the rear side over the headphone. It is noted that if the front seat user changes the source to another while the front and rear seat users are listening to the same source, then audio signals from the new source are supplied through every speaker.

As mentioned above, not only when the rear seat user selects the same source as the front seat user does, but even when he selects the different source from that on the front seat side, the known rear entertainment systems permit the users both in the front and rear seats to listen to the audio information from their selected audio source over the speakers or the headphone.

In the known rear entertainment system as described above having the subwoofer disposed in the vicinity of the rear seat, when the same audio source is selected both by the front and rear seat sides, the users in the front and rear seats can listen to the audio signals from the source over the respective speakers, thus resulting in no problem. However, when the rear seat user selects an audio source different from that selected by the front seat user, the following inconvenience occurs.

That is, when the rear and front seat users select the same audio source (hereinafter referred to as "audio signal A"), the front seat speaker, the rear seat speaker, and the subwoofer each output the audio signal A. In this state, if the rear user selects an audio source (hereinafter referred to as "audio signal B") different from that on the front side, then the audio signal B is supplied not from the rear seat speaker but from the headphone for the rear seat, whereby the rear seat user can listen to the audio signal B by means of the headphone for the rear seat.

At this time, the subwoofer still provides the audio signal A, which is the same as that supplied on the front side, towards the rear seat. This audio signal from the subwoofer has such deep bass and so much vibration that even when the rear seat user listens to the audio signal B over the headphone, he/she feels the vibrations (the audio signal A) all over his/her body. These vibrations, which differ from the audio signal B in tone, provide the rear seat user with a sense of incongruity upon listening, thereby confusing him/her.

This sense of incongruity occurs not only due to the vibrations caused by the subwoofer, but also due to similar vibrations, for example, caused by a high speed of the vehicle and the like.

SUMMARY OF THE INVENTION

The present invention has been accomplished in view of the above-mentioned technical background, and it is an object of the present invention to provide a vehicle audio system having a subwoofer mounted in the vicinity of a rear seat, which permits a user in the rear seat to receive audio information without having a sense of incongruity upon listening, even when he/she selects an audio source different from that selected on the front seat side.

To solve the foregoing problem, according to one aspect of the present invention, there is provided a vehicle audio system comprising a plurality of audio sources and an audio signal output means for providing an audio signal supplied by the selected audio source, the audio signal output means including at least a headphone for a rear seat and a speaker for the reproduction of deep bass (namely, subwoofer) disposed in the vicinity of the rear seat. The system also comprises an audio output selector for selectively switching the audio signal from the selected audio source to connect it to the audio signal output means, and a controller for controlling the audio output selector. In this system, if the controller detects predetermined input information while the audio signal is being provided from the subwoofer, then this controller controls the audio output selector such that it interrupts the connection of the audio signal to the subwoofer.

In one embodiment for the detection of the predetermined input information, when the controller judges that an audio source selected for a front seat is different from that selected for the rear seat (based on instructions from an operating section), the controller may detect the difference as the predetermined input information. In another embodiment, the controller may detect the predetermined input information based on vehicle-speed information transmitted via an information transmission path of the system, when vehicle speed exceeds a prescribed rate.

In the vehicle audio system according to this aspect of the present invention, when the controller detects the predetermined input information in a state where the audio signal is being supplied from the subwoofer (for example, when a user in the rear seat selects an audio source different from that selected by another user in the front seat, or when the vehicle speed exceeds the prescribed rate), the audio output selector interrupts the connection of the audio signal to the subwoofer based on control from the controller.

Accordingly, the subwoofer is separated from the system and stops reproducing deep bass, whereby no vibration occurs. This enables the rear seat user to listen to the audio signal, which is being currently selected, over a rear-seat-only headphone without having the sense of incongruity upon listening, regardless of whether or not the audio source being selected at the rear seat side is the same as that being selected at the front seat side.

In the vehicle audio system as mentioned above, no audio signal will be sent to the subwoofer after the controller detects the predetermined input information. Consequently, the transmission characteristics of sound in the entire reproduction space inside the vehicle after the detection of the predetermined input information differ from those before the detection. That is, a change in reflection and absorption of the sound in the reproduction space after the detection causes the sound transmission characteristics to change, thus also leading to a change in the sound field. Such a change in the sound transmission characteristics further gives rise to a change in the level of sound at every frequency band (a band level) that reaches a listener, namely the rear seat user in the vehicle, thereby causing another possible sense of incongruity to the listener.

To cope with this disadvantage, according to another aspect of the present invention, there is provided a vehicle audio system comprising a plurality of audio sources and an audio signal output means for providing an audio signal supplied by the selected audio source, the audio signal output means including at least a speaker for a front seat, a speaker for a rear seat, and a speaker for the reproduction of deep bass (subwoofer) disposed in the vicinity of the rear seat. The system also comprises an audio output controller including electronic volume controllers for the front seat and for the rear seat, each of which adjusts a level of the audio signal from the selected audio source to a corresponding predetermined level for output, an audio output selector for selectively switching the audio signal supplied from the electronic volume controller for the rear seat and operable to connect this audio signal to each of the rear seat speaker and the subwoofer, and a controller for controlling the audio output controller and the audio output selector. In this system, if the controller detects predetermined input information while the audio signals are being supplied from the rear seat speaker and from the subwoofer, then the controller controls the audio output selector such that this selector interrupts the connection of the audio signal to the subwoofer as well as the connection of the audio signal to the rear seat speaker. Particularly, the audio output controller may further comprise a sound field corrector following and connected to the electronic volume controllers for the front seat and the rear seat. Based on control by the controller, the sound field corrector may perform correction of the sound field formed by the audio signal supplied from the front seat speaker after the detection of the predetermined input information, in such a manner that this sound field is substantially identical to that previously formed by the audio signals supplied from the front seat speaker, the rear seat speaker, and the subwoofer prior to the detection of the information.

DETAILED DESCRIPTION OF PREFERRED EMBODIMENTS

Hereinafter, preferred embodiments of the present invention will be described in detail with reference to the accompanying drawings.

Figure 1:
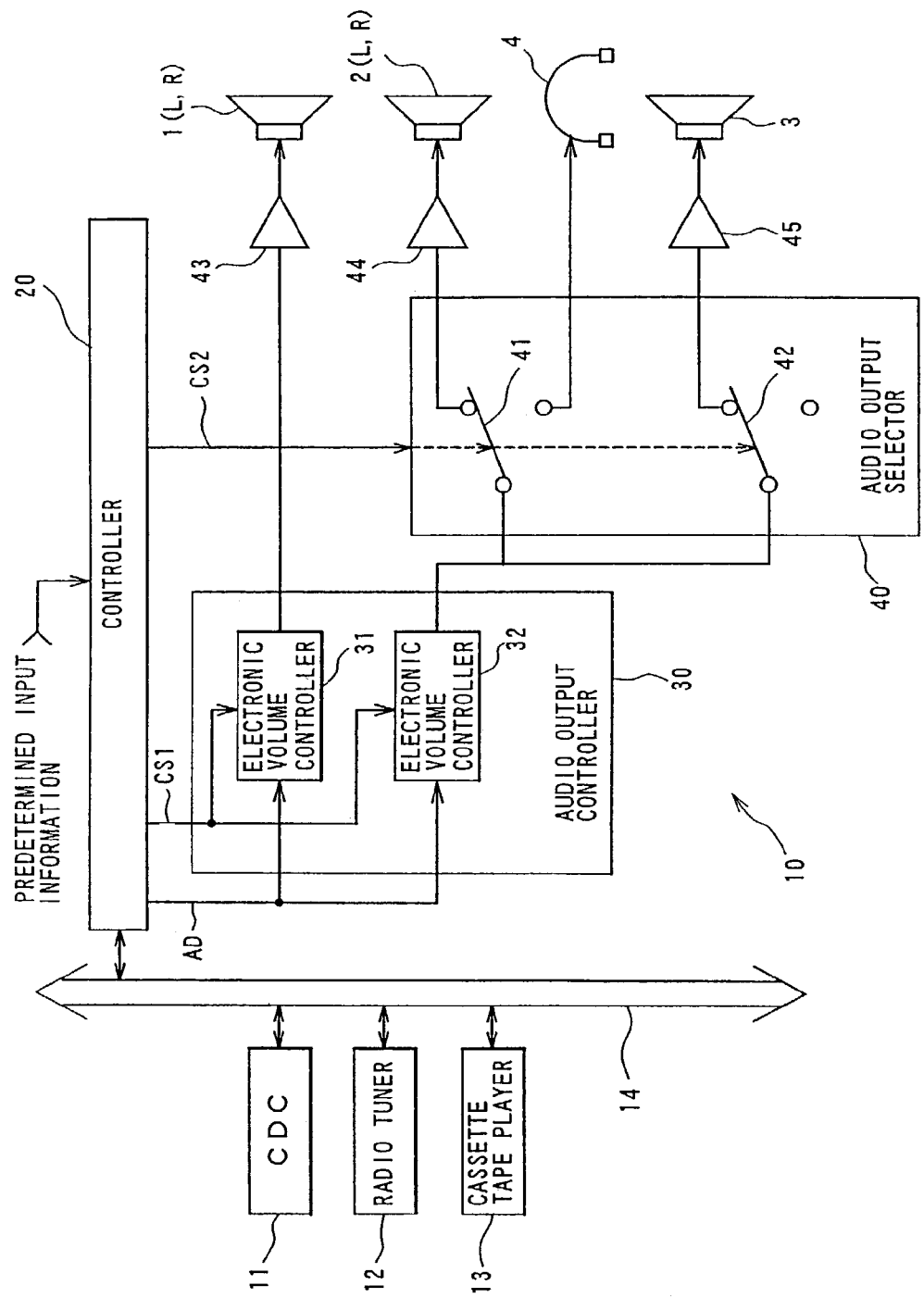
FIG. 1 is a schematic block diagram of a vehicle audio system of a first preferred embodiment according to the present invention.

FIG. 1 is a block diagram of a vehicle audio system according to a first preferred embodiment.

Figure 2:
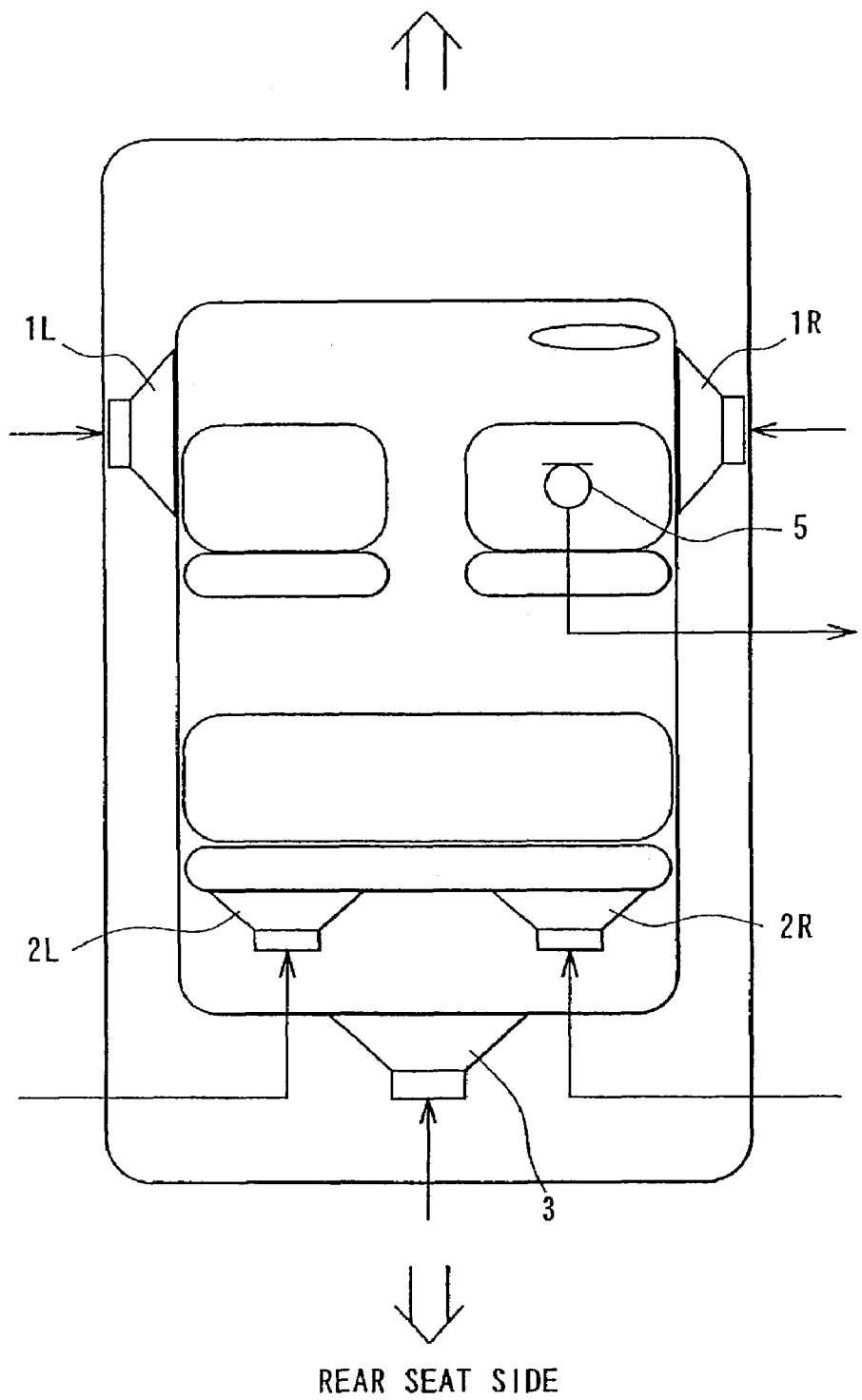
FIG. 2 is an exemplary diagram showing an arrangement of speakers and a microphone in a vehicle employing the vehicle audio system.

A vehicle audio system 10 of the embodiment includes speakers 1 (L, R) for a front seat, speakers 2 (L, R) for a rear seat, a deep bass reproduction speaker (subwoofer) 3, and a headphone 4 for the rear seat. The speakers 1 (L, R) and 2 (L, R), as schematically shown in FIG. 2, are arranged on the left and right sides of the front seat and on the left and right sides of the rear seat in the vehicle, respectively. The subwoofer 3 is disposed in the vicinity (e.g., center) of the rear seat. These speakers 1 to 3 and the headphone 4 serve as audio signal output means.

The system 10 further includes a CD changer (CDC) 11, a radio tuner 12, and a cassette tape player 13, all which function as audio sources. Each of the audio sources 11 to 13 is connected to a controller 20 via a system bus 14 such as an optical fiber serving as an information transmission path. The operation of the controller 20 will be described later.

An audio output controller 30 has an electronic volume controller 31 for the front seat and an electronic volume controller 32 for the rear seat, both of which operate based on a control signal CS1 supplied from the controller 20. Each of the electronic volume controllers 31 and 32 adjusts a level of an audio signal AD transmitted from the selected audio source via the system bus 14 and the controller 20, to a corresponding predetermined level to provide as an output the adjusted audio signal.

An audio output selector 40 has switches 41 and 42 both of which perform switching operations together in response to a control signal CS2 supplied from the controller 20. Each of the switches 41 and 42 selectively switches the audio signal received from the rear-side electronic volume controller 32 of the audio output controller 30, and connects the audio signal to either the pair of rear seat speakers 2 (L, R) and the subwoofer 3, or the headphone 4.

The audio signal from the front-side electronic volume controller 31 of the audio output controller 30 is supplied to each of the speakers 1 (L, R) for the front seat via an amplifier

43. The audio signal conducted through the switch 41 of the audio output selector 40 is supplied to each of the speakers 2 (L, R) for the rear seat via an amplifier 44. Similarly the audio signal conducted through the switch 42 is supplied to the subwoofer 3 via an amplifier 45.

The controller 20 is connected to an operating section 21 (see FIG. 3) that is used by users in the front seat and the rear seat to enter instructions for various selections and operations. This operating section 21 has various kinds of keys, such as a source selection key, a power supply key, a numeric keypad, and the like. Preferably, a plurality of operating sections 21, not shown, should be provided in the system at the front seat side and the rear seat side, thereby enabling the front seat user and the rear seat user to manipulate the system with ease.

The controller 20, when provided with instructions for operation and the like via the operating section 21, converts data in the instructions into a predetermined communications format and transmits the converted data to the audio sources 11 to 13 via the system bus 14. The controller also receives audio data transmitted from the audio source selected by the instructions, via the system bus 14, and performs predetermined demodulation processing on the received data. After this demodulation, the controller executes reproduction control of the audio information to provide an audio signal AD.

Each of the audio sources 11 to 13 receives data concerning the instructions for operation supplied by the controller 20 via the system bus 14, and sets an operating state based on the received data. Data indicative of the changed result (a present operating state after the changeover) is transmitted as the audio information to the controller 20 via the system bus 14. For example, in the CDC 11 having a plurality of compact discs (CDs) held therein, the CDC reads signals from a recording surface of a CD selected by the user in response to operation instructions supplied from the controller 20, and transmits reproduced audio data to the controller 20 via the system bus 14. Similarly, for the radio tuner 12, the radio tuner generates audio signals by receiving and demodulating signals from a selected FM or AM broadcasting station in response to operation instructions supplied from the controller 20, converts the audio signals into digital audio data, and transmits the audio data to the controller 20 via the system bus 14.

In the vehicle audio system 10 of the preferred embodiment, if the controller 20 detects predetermined input information while the audio signal is being provided from the subwoofer 3, then the audio output selector 40 switches each of switches 41 and 42 to an opposite position based on control (the control signal CS2) supplied from the controller 20, thereby interrupting connection of the audio signals to the rear seat speakers 2(L, R) and connection of the audio signal to the subwoofer 3, while connecting the audio signal being currently selected by the rear seat user to the headphone 4.

Next, a method for detecting the predetermined input information, which is carried out by the controller 20, will be described with reference to FIG. 3.

Figure 3:
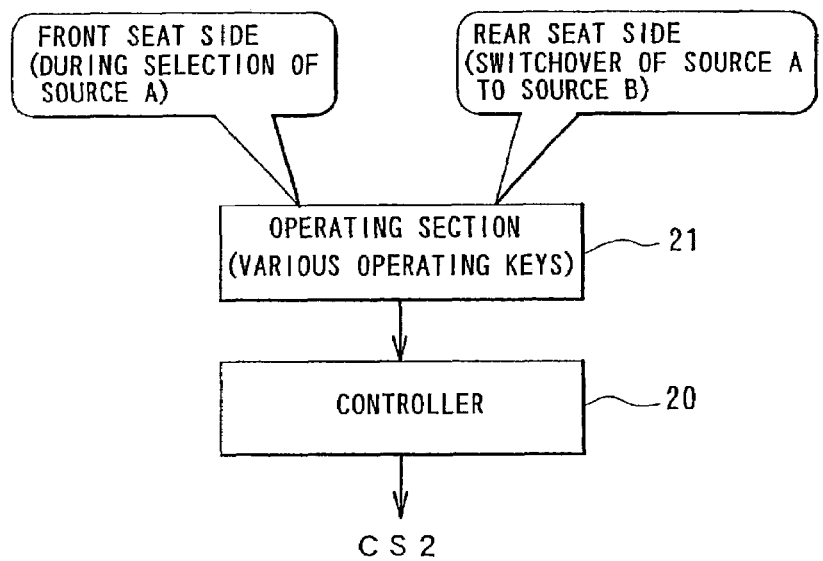
FIG. 3 is an explanatory diagram showing a method of detecting predetermined input information which is carried out by a controller of FIG. 1.
Figure 3:
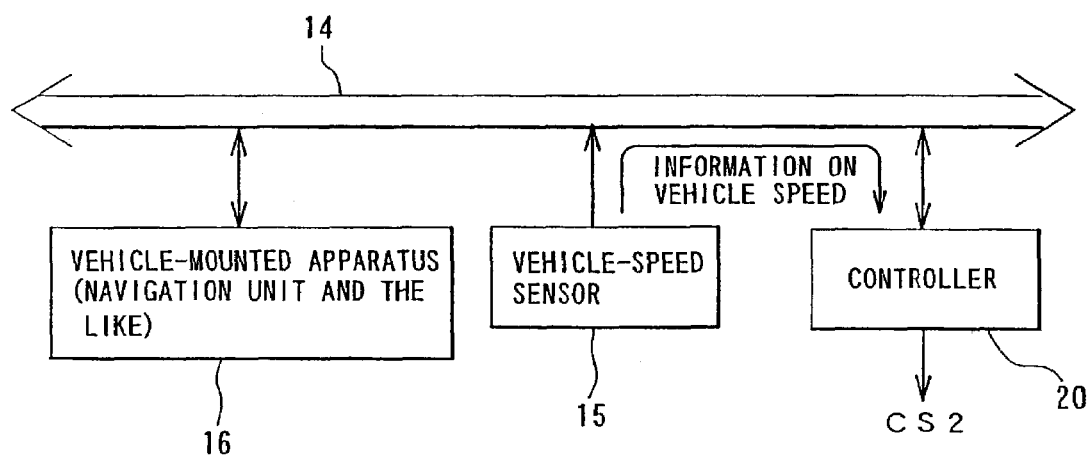

In the example of FIG. 3(*a*), when the rear seat user or passenger switches a source A (for example, CDC 11), which is the same as that being selected on the front seat side, to a different source B (for example, radio tuner 12), that is, when the controller 20 judges that the audio source selected on the front seat side is different from that selected on the rear seat side, the controller detects information indicative of the difference as the above-mentioned "predetermined input information" based on the operation instructions supplied from the operating section 21.

Alternatively, the example of FIG. 3(*b*) shows that in a case where the information transmission path (system bus 14) is connected to output means for supplying information on vehicle speed (namely, vehicle-speed sensor 15) and another vehicle-mounted apparatus 16 (for example, navigation unit and the like), the controller 20 is designed to detect the predetermined input information if the vehicle speed exceeds a prescribed rate, based on the vehicle-speed information transmitted through the system bus 14.

As mentioned above, according to the vehicle audio system 10 of the preferred embodiment, if the controller 20 detects the predetermined input information by the method as shown in FIG. 3, while the audio signal is being provided from the subwoofer 3, then the audio output selector 40 has the switches 41 and 42 switched together to opposite positions thereof in response to the control signal CS2 supplied from the controller 20. As a result, the connection of the audio signal to each of the rear seat speakers 2 (L, R) and the connection of the audio signal to the subwoofer 3 is interrupted or cut, while the audio signal being currently selected on the rear seat side is connected or coupled to the headphone 4.

Accordingly, the subwoofer 3 is separated from the system and terminates the function of reproducing the deep bass, so that no vibrations will occur. This permits the rear seat user to listen to the audio signal being currently selected without having a sense of incongruity when listening with the rear-seat-only headphone 4, regardless of whether or not the currently selected audio source on the rear seat side (for example, the source B after the switching in FIG. 3(*a*)) is the same as the audio source being selected on the front seat side (for example, the source A).

Figure 4:
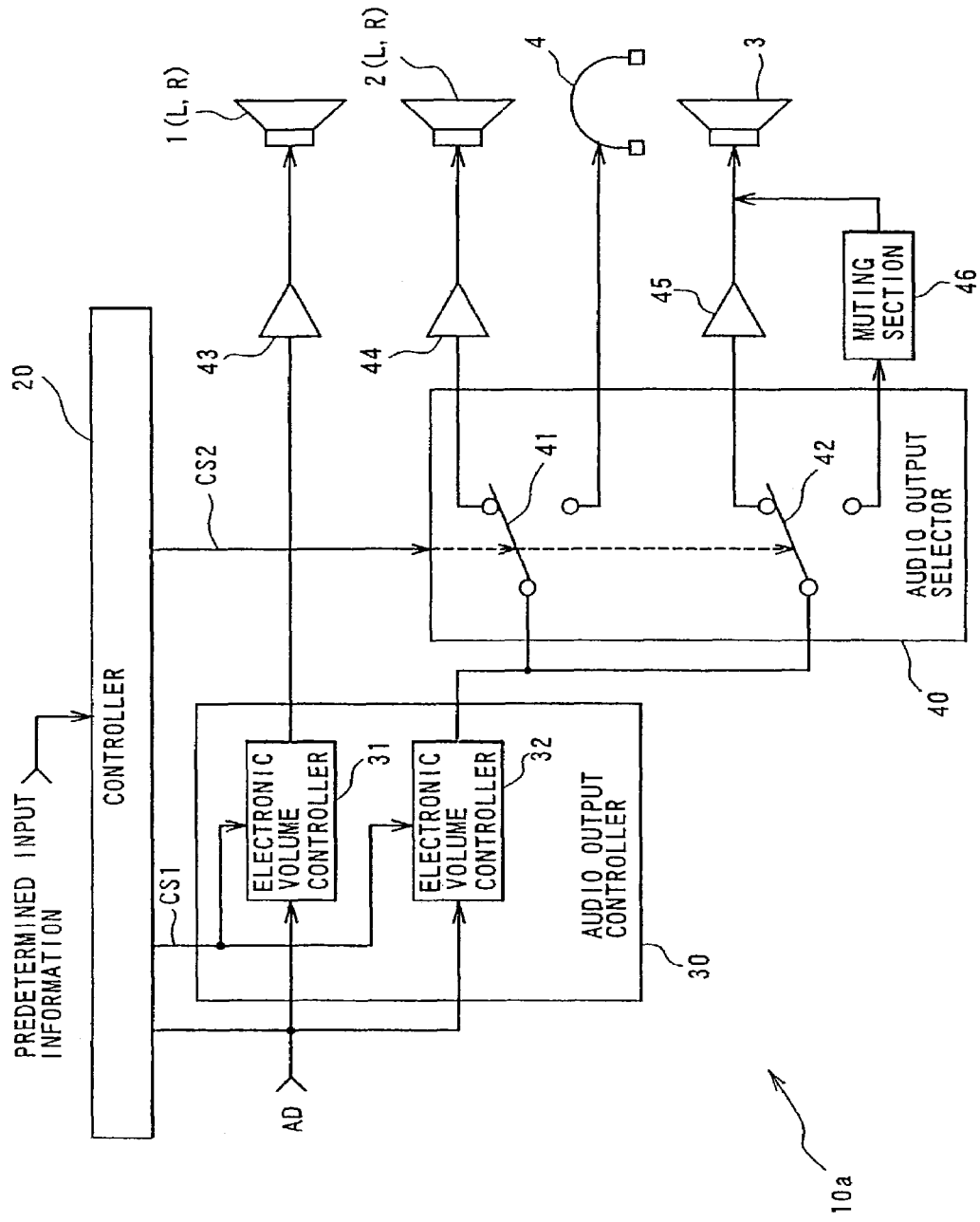
FIG. 4 is a schematic block diagram of a vehicle audio system of a second preferred embodiment according to the present invention.

FIG. 4 shows a schematic configuration of a vehicle audio system of the second preferred embodiment according to the present invention. The audio sources 11 to 13 and the system bus 14 are omitted from the figure.

A vehicle audio system 10*a* of the second embodiment, in addition to the configuration of the vehicle audio system 10 (see FIG. 1) of the first embodiment, further includes a muting section 46 that is operable to reduce a level of the audio signal to be supplied to the subwoofer 3 to no more than a predetermined level. The predetermined level is set to a sufficiently low level so as not to disturb the rear seat user's listening. The configuration and operation of other components are the same as those described in the first preferred embodiment, and the explanation thereof will be omitted hereinafter.

In the second preferred embodiment, after the controller 20 detects the predetermined input information, it controls the audio output selector 40 such that the selector switches each of the switches 41 and 42 to an opposite position thereof to interrupt the direct connection of the audio signal to the subwoofer 3 as well as the connection of the audio signal to the rear seat speakers 2 (L, R), while connecting the audio signal being currently selected on the rear seat side to the headphone 4. Simultaneously, the controller 20 controls the selector such that it also makes indirect connection of the audio signal to the subwoofer 3 via the muting section 46.

According to the vehicle audio system 10*a* of the second preferred embodiment, even after the controller 20 detects the predetermined input information, the subwoofer 3 is still connected to the system and performs the deep-bass reproduction function. The muting section 46, however, reduces the level of the audio signal from the subwoofer 3 to a sufficiently low level so as not to disturb the rear seat user's listening, thereby allowing the rear seat user to listen to the audio signal being selected over the rear-seat-only headphone 4 without having the sense of incongruity upon listening, in the same way as that of the first preferred embodiment (as shown in FIG. 1).

In the above-mentioned vehicle audio systems 10 and 10a of the first and second preferred embodiments, after the controller 20 detects the predetermined input information, the audio signal either will not be provided from the subwoofer 3 (see FIG. 1) or the signal level will be reduced (see FIG. 4). Accordingly, the sound transmission characteristics in a reproduction space of the vehicle will differ depending on the timing, that is, before or after the detection of the predetermined input information. In other words, the sound field is changed after the detection of the information. Such a change in the sound field causes the sound level at every frequency band (band level) that reaches a listener in the vehicle to change, thus possibly resulting in another sense of incongruity. To eliminate this inconvenient possibility, the following embodiment is proposed in the present invention.

Figure 5:
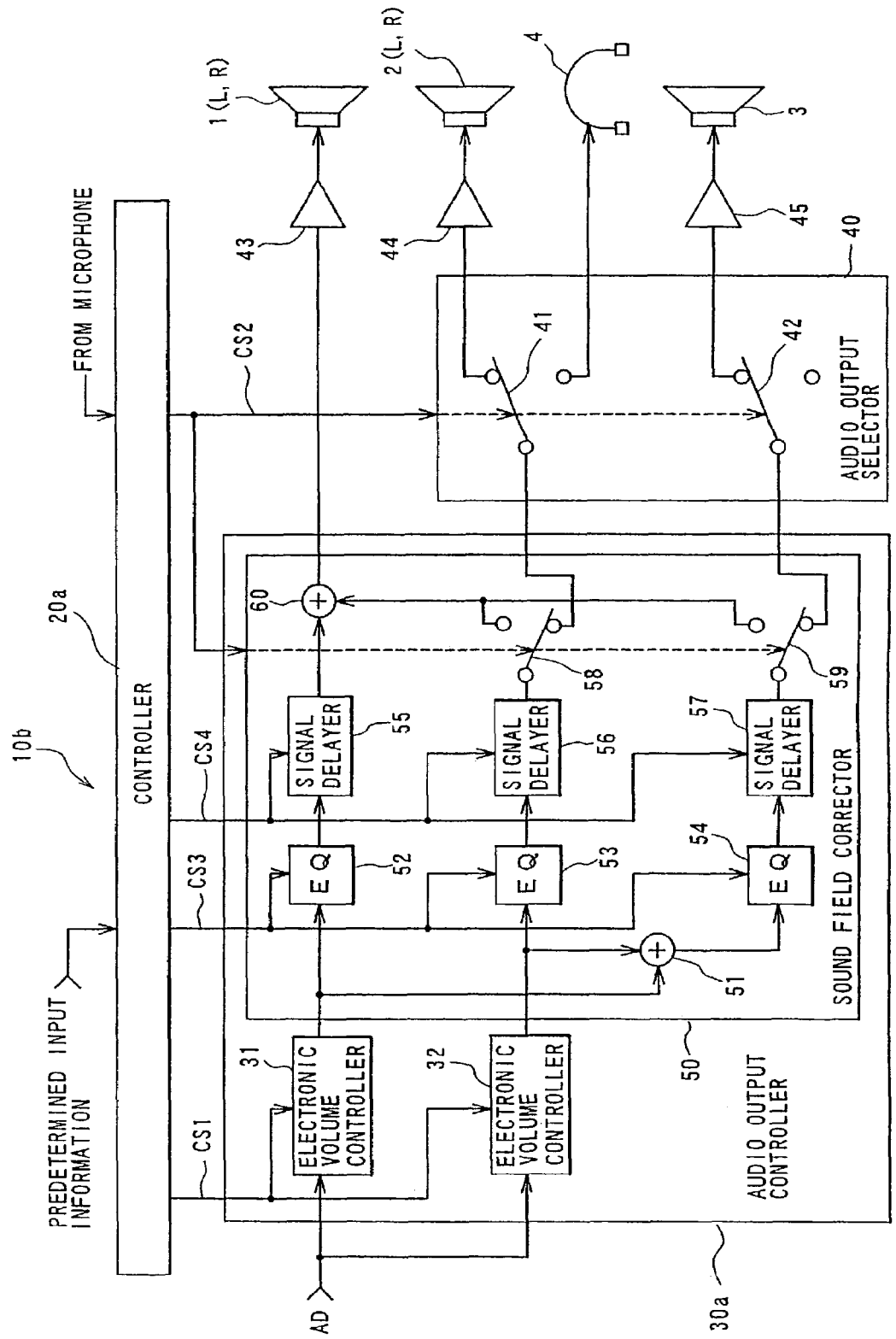
FIG. 5 is a schematic block diagram of a vehicle audio system of a third preferred embodiment according to the present invention.

FIG. 5 shows a schematic configuration of a vehicle audio system of the third preferred embodiment according to the present invention. The audio sources 11 to 13 and the system bus 14 are omitted from the figure, in the same way as that of the example in FIG. 4.

The vehicle audio system 10b of the third embodiment differs from the vehicle audio system 10 (see FIG. 1) of the described first embodiment in that the audio output controller 30a has a sound field corrector 50 following and connected to the electronic volume controllers 31 and 32, and the microphone 5 is disposed at a specific listening point inside the vehicle (near the driver's seat in FIG. 2). The configuration and operation of other components are basically the same as those described in the first preferred embodiment, and the explanation thereof will be omitted hereinafter.

The sound field corrector 50 has the general function of correcting or amending the sound field that is formed by the audio signals provided from the front seat speakers 1 (L, R) after the detection of the predetermined input information, based on the control by the controller 20a, in such a manner that this sound field is substantially identical to that previously formed by the audio signals provided from the front seat speakers 1 (L, R), the rear seat speakers 2(L, R), and the subwoofer 3 prior to the detection of the information.

In more detail, the sound field corrector 50 includes a mixer 51 for mixing the audio signals received from the electronic volume controllers 31 and 32, an equalizer (EQ) 52 for adjusting a band level of the audio signal received from the electronic volume controller 31 based on a control signal CS3 from the controller 20a, an equalizer (EQ) 53 for adjusting a band level of the audio signal received from the electronic volume controller 32 based on the control signal CS3, an equalizer (EQ) 54 for adjusting a band level of the audio signal received from the mixer 51 based on the control signal CS3, signal delayers 55 to 57 for delaying respective signals supplied from the equalizers 52 to 54 by predetermined time intervals based on a control signal CS4 from the controller 20a, switches 58 and 59 for performing switching operations together in response to the control signal CS2 supplied from the controller 20a, and a mixer 60. Each of the equalizers 52 to 54 adjusts the band level of the corresponding audio signal according to a filter coefficient individually set for the signal based on the control signal CS3 from the controller 20a.

Before the controller 20a detects the predetermined input information (in a connection state as shown in the figure), the signal from the equalizer 52 is supplied to the amplifier 43 via the signal delayer 55 and the mixer 60 to be amplified and provided to the front seat speakers 1 (L, R). The signal from the equalizer 53 is supplied to the amplifier 44 via the signal delayer 56, the switch 58, and the switch 41 to be amplified and provided to the rear seat speakers 2 (L, R). Similarly, the signal from the equalizer 54 is supplied to the amplifier 45 via the signal delayer 57, the switch 59, and the switch 42 to be amplified and provided to the subwoofer 3.

In contrast, after the controller 20a detects the predetermined input information, the switches 58 and 59 as well as the switches 41 and 42 are switched into the opposite positions, whereby the audio signals previously supplied to the rear seat speakers 2 (L, R) and the subwoofer 3 are supplied to the mixer 60 via the respective switches 58 and 59. Then, the audio signal supplied to the front seat speakers 1 (L, R) and the audio signals previously supplied to the rear seat speakers 2 (L, R) and the subwoofer 3 are mixed by the mixer 60 and sent to the amplifier 43 to be amplified, and thereafter the amplified signal is supplied to the front seat speakers 1 (L, R).

In this embodiment, the controller 20a generates the control signals CS3 and CS4 used for controlling the sound field corrector 50 (including the equalizers 52 to 54, and the signal delayers 55 to 57) based on an output signal from the microphone 5. The details of the method in which the controller 20a controls the sound field corrector 50 based on the output signal from the microphone 5 are disclosed, for example, in Japanese Patent Publication No. 2001-25100, which is titled "Autographic Equalizer and Band Level Setting Method." An outline of the control method follows.

First, the microphone 5 in the vicinity of the driver's seat receives sound waves from the speakers 1L, 1R, 2L, 2R, and the subwoofer 3 and converts them into an electric signal. The signal from the microphone 5 is divided by every band according to divided bands of the respective equalizers 52 to 54, and each divided signal has its band level calculated. Next, this calculated band level is compared with a band level previously set as a target. Thus, all divided signals have band levels thereof calculated, and the respective calculated band levels are compared with the target band level, so that a difference (an error) between the target band level and the calculated one at every band is obtained. In accordance with the level differences (errors) obtained by the calculation, the controller 20a sets the filter coefficient (control signal CS3) of each of the equalizers 52 to 54, or sets the time periods (control signal CS4) by which the signal delayers 55 to 57 delay their respective signals.

According to the vehicle audio system 10b of the third preferred embodiment, after the controller 20a detects the predetermined input information, the audio output selector 40 has the switches 41 and 42 switched together to the respective opposite positions, while having the switches 58 and 59 of the sound field corrector 50 switched together to the respective opposite positions, based on the control signal CS2 from the controller 20a. Accordingly, the audio signal supplied to the front seat speakers 1 (L, R) and the audio signals supplied to the rear seat speakers 2 (L, R) and the subwoofer 3 are mixed and supplied to only the front seat speakers 1 (L, R). As a result, the sound field formed after the controller 20a detects the predetermined input information becomes substantially identical to that formed before the detection of the information. This permits the listener in the vehicle to listen to the audio signals without having the sense of incongruity.

As can be seen from the above description, according to the present invention, the vehicle audio system having a subwoofer disposed in the vicinity of the rear seat enables the listener or user in the rear seat to listen to the audio signal selected on the rear seat side without having the sense of incongruity, even when he/she selects an audio source different from that selected on the front seat side.

What is claimed is:

1. A vehicle audio system comprising:
a plurality of audio sources;
audio signal output means for providing an audio signal supplied by a selected audio source, the audio signal output means including at least a headphone for a rear seat of a vehicle, and a speaker for the reproduction of deep bass disposed in the vicinity of the rear seat, said headphone and said speaker each capable of reproducing a signal from a different one of the plurality of audio sources simultaneously;
an audio output selector for selectively switching the audio signal from the selected audio source to connect said audio signal to said audio signal output means; and
a controller for controlling said audio output selector, said controller operable to check for a plurality of predetermined conditions and judge that one of the plurality of predetermined conditions exists when said controller detects predetermined input information corresponding to said one of the plurality of predetermined conditions,
wherein, if the controller detects said predetermined input information while the audio signal is being provided from said deep bass reproduction speaker, then said controller automatically (1) controls the audio output selector such that said selector interrupts the connection of said audio signal to said deep bass reproduction speaker and stops reproducing said deep bass, and (2) supplies a first audio signal previously supplied to a rear seat speaker and a second audio signal previously supplied to said deep bass reproduction speaker to a mixer, said mixer mixing the first and second audio signals with a third audio signal previously supplied to a front seat speaker to generate a mixed signal, and thereafter the mixed signal is supplied to said front seat speaker, whereby the sound field formed after said controller detects said predetermined information becomes substantially identically to that formed before the detection of said predetermined information.

2. The vehicle audio system according to claim 1, wherein, when controlling the audio output selector such that said selector interrupts the connection of the audio signal to said deep bass reproduction speaker, said controller controls the audio output selector such that said selector connects the audio signal to said headphone.

3. The vehicle audio system according to claim 1, wherein, when the controller judges that the audio source selected for a front seat is different from that selected for the rear seat, said controller detects the difference as said predetermined input information.

4. The vehicle audio system according to claim 3, further comprising an operating section for giving the controller an instruction to selectively operate said plurality of audio sources,
wherein, when the audio source for the rear seat different from that selected for the front seat is selected based on the instruction for the operation provided by said operating section, said controller detects information indicative of the difference as said predetermined input information.

5. The vehicle audio system according to claim 1, further including information output means for providing information on vehicle speed, and an information transmission path connected to the vehicle-mounted apparatuses,
wherein said controller detects said predetermined input based on the vehicle-speed information transmitted via said information transmission path information when the vehicle speed exceeds a prescribed rate.

6. The vehicle audio system according to claim 1,
wherein, if the controller detects said predetermined input information while the audio signals are being provided from said rear seat speaker and from said deep bass reproduction speaker, said controller controls the audio output selector such that said selector interrupts the connection of the audio signal to said deep bass reproduction speaker as well as the connection of the audio signal to said rear seat speaker, while connecting the audio signal to said headphone.

7. A vehicle audio system comprising:
a plurality of audio sources;
audio signal output means for providing an audio signal supplied by a selected audio source, the audio signal output means including at least a speaker for the reproduction of deep bass disposed in the vicinity of a rear seat of a vehicle;
a muting section for reducing a level of the audio signal supplied to said deep bass reproduction speaker such that an amount of vibration felt in the vicinity of said rear seat of said vehicle that is caused by said reproduction of said deep bass is reduced to no more than a predetermined level, the predetermined level being set to a sufficiently low level so as not interfere with a second audio signal being reproduced by a rear seat speaker but not eliminated;
an audio output selector for selectively switching the audio signal from the selected audio source to connect said audio signal to one of said audio signal output means and the muting section; and
a controller for controlling said audio output selector, said controller being configured to detect a plurality of predetermined conditions, said plurality of predetermined conditions including (1) whether an audio source selected for a front seat is different from that selected for said rear seat and (2) if vehicle speed exceeds a prescribed rate,
wherein, if the controller detects that one of said plurality of predetermined conditions exists while the audio signal is being provided from said deep bass reproduction speaker without passing through said muting section, said controller automatically controls the audio output selector such that said selector connects the audio signal to said deep bass reproduction speaker via said muting section resulting in said vibration felt in the vicinity of said rear seat caused by said reproduction of said deep bass is reduced to alleviate incongruities between two audio signals sensed in the vicinity of said rear seat.

8. The vehicle audio system according to claim 7, further comprising an operating section for giving the controller an instruction to selectively operate said plurality of audio sources.

9. The vehicle audio system according to claim 7, further including information output means for providing information on vehicle speed, and an information transmission path connected to the vehicle-mounted apparatuses,
wherein said controller detects that vehicle speed exceeds the prescribed rate based upon the vehicle-speed information transmitted via said information transmission path.

10. A vehicle audio system comprising:
a plurality of audio sources;
audio signal output means for providing an audio signal supplied by a selected audio source, the audio signal output means including at least a speaker for a front seat area of a vehicle, a speaker for a rear seat area thereof, and a speaker for the reproduction of deep bass disposed in the vicinity of the rear seat, the front seat area, rear seat area, and deep bass speakers are operable to simultaneously reproduce sound;

an audio output controller including electronic volume controllers for the front seat and for the rear seat, each of the electronic volume controllers adjusting a level of the audio signal from the selected audio source to a predetermined level to provide as an output the corresponding adjusted audio signal;

an audio output selector for selectively switching the audio signal transmitted through said electronic volume controller for the rear seat, and operable to connect said audio signal to each of said rear seat speaker and said deep bass reproduction speaker; and a controller for controlling said audio output controller and said audio output selector, wherein, when the controller detects predetermined input information while the audio signals are being simultaneously provided from said rear seat speaker and from said deep bass reproduction speaker, said controller controls the audio output selector such that said selector interrupts the connection of the audio signal to both said deep bass reproduction speaker and said rear seat speaker based upon the predetermined input information such that said deep bass being reproduced from said deep bass reproduction speaker is altered so the amount of vibration sensed in the vicinity of said rear seat is automatically reduced and said rear seat speaker stops reproducing sound, and said audio output controller further comprises a sound field corrector following and connected to said electronic volume controllers for said front seat and said rear seat, and wherein, based on control by the controller, said sound field corrector performs automatic correction of a sound field formed by the audio signal provided from said front seat speaker after the detection of said predetermined input information, in such a manner that said sound field is substantially the same as that previously formed by the audio signals provided from (1) said front seat speaker, (2) said rear seat speaker, and (3) said deep bass reproduction speaker prior to the detection of said predetermined input information by mixing a first audio signal associated with said front seat speaker, a second audio signal associated with said rear seat speaker, and a third audio signal associated with said deep bass reproduction speaker and supplying a resultant mixed signal to said front seat speaker.

11. The vehicle audio system according to claim 10, wherein said sound field corrector following and connected to said electronic volume controllers for said front seat and said rear seat includes a mixer operable to mix the audio signals received from the electronic volume controllers and a dedicated equalizer for each of (1) said front seat speaker, (2) said rear seat speaker, and (3) said deep bass reproduction speaker.

12. The vehicle audio system according to claim 10, wherein said sound field corrector comprises a plurality of equalizers operable to automatically adjust a level of each audio signal at a plurality of frequency bands, which has been level-adjusted through said corresponding electronic volume controller, and a plurality of signal delayers for delaying respective signals received from said plurality of equalizers by predetermined time intervals.

13. The vehicle audio system according to claim 12, further comprising a microphone disposed for listening inside the vehicle, wherein said controller controls said plurality of equalizers and said plurality of signal delayers based on a signal received from said microphone.

14. The vehicle audio system according to claim 10, wherein, when the controller judges that the audio source selected for the front seat is different from that selected for the rear seat, said controller detects the difference as said predetermined input information.

15. The vehicle audio system according to claim 14, further comprising an operating section for giving the controller an instruction to selectively operate said plurality of audio sources, wherein, when the audio source for the rear seat different from that selected for the front seat is selected based on the instruction for operation provided by said operating section, said controller detects information indicative of the difference as said predetermined input information.

16. The vehicle audio system according to claim 10, further including information output means for providing information on vehicle speed, and an information transmission path connected to the vehicle-mounted apparatuses, wherein said controller detects said predetermined input information based on the vehicle-speed information transmitted via said information transmission path when the vehicle speed exceeds a prescribed rate.

17. A method in a vehicle audio system for reproducing an audio signal, the method comprising:

detecting predetermined input information in a state where audio signals from at least one a rear seat speaker and from a deep bass reproduction speaker mounted in the vicinity of a rear seat of a vehicle are simultaneously reproduced;

interrupting the connection of the audio signals to both said deep bass reproduction speaker and said at least one rear seat speaker in response to the detection of said predetermined input information, while connecting the audio signal to a headphone for use in the rear seat such that any vibration that occurs in the vicinity of the rear seat caused by sound reproduced by said deep bass reproduction speaker and that is incongruous with said audio signal reproduced by said headphone is reduced; and correcting a sound field formed in the vehicle generated from only at least one front seat speaker after the detection of said predetermined input information in such a manner that said sound field is substantially identical as that previously formed in the vehicle prior to the detection of said predetermined input information by mixing (1) a first audio signal previously associated with said at least one front seat speaker, (2) a second audio signal previously associated with said at least one rear seat speaker, and (3) a third audio signal previously associated with said deep bass reproduction speaker to supply a resultant mixed audio signal to said at least one front seat speaker.

18. The method according to claim 17, further comprising:
when judging that the audio source selected for a front seat is different from that selected for the rear seat, detecting the difference as said predetermined input information.

19. The method according to claim 17, further comprising:
when the audio source for the rear seat different from that selected for the front seat is selected based on an instruction to selectively operate the plurality of audio sources, detecting information indicative of the difference as said predetermined input information.

20. The method according to claim 17, wherein the audio signal supplied to said deep bass reproduction speaker is reduced to a predetermined lower level when said predetermined input information is detected.

* * * * *

UNITED STATES PATENT AND TRADEMARK OFFICE
CERTIFICATE OF CORRECTION

PATENT NO. : 7,466,828 B2  Page 1 of 1
APPLICATION NO. : 10/299045
DATED : December 16, 2008
INVENTOR(S) : Tsuyoshi Ito It is certified that error appears in the above-identified patent and that said Letters Patent is hereby corrected as shown below:

In column 9, claim 1, line 37, before "to that formed before" delete "identically" and substitute --identical-- in its place.

Signed and Sealed this

Sixteenth Day of June, 2009

JOHN DOLL
*Acting Director of the United States Patent and Trademark Office*